United States Patent [19]
Bianco

[11] Patent Number: 5,295,758
[45] Date of Patent: Mar. 22, 1994

[54] SLIDING ROTATABLE BINDER ATTACHMENT

[75] Inventor: Ronald M. Bianco, Irvine, Calif.
[73] Assignee: Day Runner, Inc., Fullerton, Calif.
[21] Appl. No.: 1,150
[22] Filed: Jan. 7, 1993
[51] Int. Cl.⁵ .......................................... B42D 13/00
[52] U.S. Cl. .................................... 402/79; 281/51; 283/117; 402/80 R
[58] Field of Search ................. 281/38, 51; 283/117; 402/79, 80 R, 80 P, 80 L

[56] References Cited

U.S. PATENT DOCUMENTS

| | | | |
|---|---|---|---|
| D. 311,220 | 10/1990 | Kam | D19/26 |
| 667,826 | 2/1901 | Mets | 248/458 |
| 2,287,390 | 6/1942 | Michael | 281/4 |
| 2,526,090 | 10/1950 | Slonneger et al. | 282/8 |
| 3,091,482 | 5/1963 | Cirigliano | 281/33 |
| 3,366,359 | 1/1968 | Wolf et al. | 248/447 |
| 3,557,474 | 1/1971 | Palmer | 40/10 |
| 4,049,119 | 9/1977 | Wilson | 402/79 X |
| 4,356,651 | 11/1982 | Barlow | 40/308 |
| 4,614,450 | 9/1986 | Neiman | 402/79 |
| 4,832,191 | 5/1989 | Gerver et al. | 206/232 |
| 4,981,386 | 1/1991 | Beleckis | 402/73 |
| 5,015,114 | 5/1991 | Miller | 402/79 X |
| 5,048,869 | 9/1991 | Schwartz | 402/80 R X |
| 5,058,736 | 10/1991 | Bedol | 206/214 |

FOREIGN PATENT DOCUMENTS

| | | | |
|---|---|---|---|
| 170723 | 5/1906 | Fed. Rep. of Germany | 281/42 |
| 2248693 | 5/1975 | France | 402/80 R |
| 2459142 | 2/1981 | France | 281/51 |
| 2587650 | 3/1987 | France | 281/45 |
| 70315 | 4/1946 | Norway | 281/42 |
| 215159 | 9/1967 | Sweden | 281/16 |
| 1280156 | 7/1972 | United Kingdom | 402/79 |

*Primary Examiner*—Paul A. Bell
*Attorney, Agent, or Firm*—Pretty, Schroeder, Brueggemann & Clark

[57] ABSTRACT

An improved binder attachment having a frame and an article, such as a calculator, mounted thereto. The frame includes a center portion and two arm portions. A slot engaging element is mounted to each arm portion so as to define an opening therebetween. The article is received in the opening and has a top edge surface and a bottom edge surface, each defining a slot for receiving the slot engaging elements. When the frame is attached to the binder, the article is permitted to slide along the slot engaging elements such that the article may be placed in adjacent face-up locations.

20 Claims, 3 Drawing Sheets

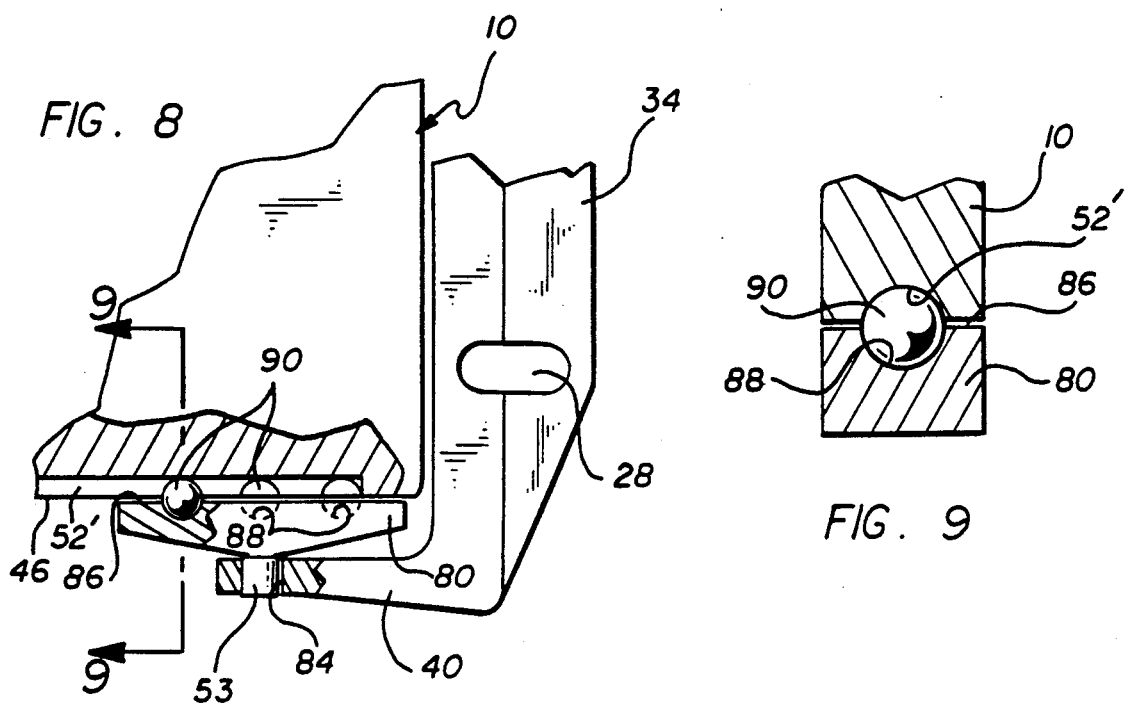

SLIDING ROTATABLE BINDER ATTACHMENT

BACKGROUND OF THE INVENTION

The present invention relates to attachments for notebook binders, and more particularly, to attachments for supporting and holding articles such as calculators or other electronic devices, to-do lists and checklists, self-stick removable notes, and the like, that are used to supplement, or are used in conjunction with, information written on the pages of the binder.

For optimal convenience and accessibility, such attachments should be firmly and securely affixed to the binder in a manner that renders the article usable on either side of the binder center or alongside the binder. Generally, simple attachments now in use, such as plastic page markers, dividers or rulers can be placed where needed within a binder by opening the binder rings and passing the rings through corresponding holes near the edge of the attachment. However, if an article were to be supported by an appropriately sized but simple attachment similar to those currently available, such an attachment would hold it in only one position in which the holes for engaging the binder rings would always be on a predetermined side of the article. This arrangement would be satisfactory only if the written information being accessed were consistently found on one side of the rings.

In other words, if the information being accessed were found on the front of each page attached to the binder rings through holes at the left margin, the calculator or other article to be used in conjunction with this information should be located on the opposite panel, attached to the binder rings by holes or detents near its right edge. Conversely, if the information being accessed were found on a page attached to the rings by holes in its right margin, for accessibility and ease of use the article should be mounted on the opposite panel, attached to the binder rings by holes or detents near its left edge.

In most situations, however, written information is found on both sides of the binder rings. Thus, an attachment of the above-mentioned type is not conveniently usable with all of the information. This drawback limits severely the utility of most binder attachments currently available. Even if the article is to be accessed concurrently with information found on the opposite side of the rings, but spread over a number of different pages, the panel must be repeatedly dismounted and remounted on the rings of the binder if it is to be accessible concurrently with that information. This also is cumbersome and clearly undesirable. Moreover, on occasion it may be beneficial to use the article independently of information contained within the binder while the binder is closed, but without detaching it from the binder. This is clearly impossible when the article is secured to a panel mounted on the rings of the binder.

The above drawbacks limit the utility of most currently available devices for attaching articles such as electronic calculators, other electronic processors or other devices to ring binders. It should, therefore, be appreciated that there is a need for an improved binder attachment which would reliably secure such articles to a binder, be conveniently usable in conjunction with, as well as independently of, information contained within the binder, and be readily accessible inside, outside or alongside the binder. The present invention fulfills that need.

SUMMARY OF THE INVENTION

The present invention is an improved binder attachment wherein an article such as a calculator or other device may be secured to the center of the binder and be placed face up on either side of the center, or secured to a side edge of a cover of the binder and be placed face up on either side of the side edge or be placed face up on an outside surface of the cover of the binder. The binder attachment includes a frame that supports a pair of spaced apart, slot engaging elements, and an article having a pair of slotted surfaces for slidably receiving the slot engaging elements. By this arrangement, the article is permitted to slide from one location of the binder to an adjacent location. The sliding movement permits the article to maintain its face up orientation in the two adjacent locations.

In the preferred embodiment, the frame has a center portion that is secured to the binder and a pair of short arms extending perpendicularly from either end of the center portion. Each arm holds one of the slot engaging elements which may simply be inwardly extending pins or, alternatively, sliding pieces that directly engage the slots or sliding pieces that use ball bearings to engage the slots.

The article may be a calculator or other electronic device, or may simply be a note pad, a checklist, self-stick removable notes, or the like. The article may also be a support member or a slipcase that holds the above-mentioned articles. A preferred slipcase for use with the present invention is shown and described in U.S. application Ser. No. 07/897,902, by Ronald M. Bianco, filed Jun. 12, 1992, the disclosure of which is hereby incorporated by reference.

Preferably, the article is rectangular, having a back surface, a front working surface (e.g., the keyboard and display panel of a calculator), a top edge surface, a bottom edge surface and two side edge surfaces. The top and bottom edge surfaces each define a slot substantially along the full length of each respective surface. The slots are configured to receive and hold the slot engaging element. To improve the appearance and compact nature of the attachment, the shape of the sides of the article may be made so as to closely conform to the shape of the inside edge of the center portion of the frame.

It should be apparent that if the frame is secured at the center of the binder, then the article may be disposed with its front working surface exposed for use at adjacent locations on either side of the center of the binder, depending on whether the slot engaging elements are located in one end of the slots of the article or the other end of the slots. Similarly, if the frame is secured along an edge of the binder, the article may be disposed with the front surface exposed for use at adjacent locations, one location being inside the binder, the other location being outside the binder. A primary benefit of the present invention is that the frame and article lie relatively flat while in the binder and even while the article is being moved from one location to an adjacent location. Thus, movement of the article is more compact and requires a relatively smaller obstruction-free envelope.

The benefits of the invention are further enhanced when the attachment is used with a ring binder. For example, the center portion of the frame may be provided with openings for engaging the rings of a ringed binder. In this embodiment, the attachment will lie perfectly flat and face up on one side of the binder, with each slot engaging element located in one end of each of the slots of the article. To move the article to the other side of the binder, the frame is moved along the rings of the binder and the article is rotated relative to the frame a sufficient amount so as to permit the inside edge of the article to clear the inside edge of the center portion of the frame, then the article is slid along the slot engaging elements until the elements are located in the opposite ends of each of the slots of the article. Finally, the frame is moved along the rings and the article is rotated relative to the frame such that the frame and article rest perfectly flat on the other side of the binder.

Rotatably securing the frame to an outside edge of the cover of the binder provides even further benefits. Not only is the front working surface of the article accessible on the inside surface of the cover and at an adjacent location outside the binder, but the article may also be placed on the outside surface of the cover so that the front working surface is accessible to a user at that location. This may be done by first sliding the article from a position wherein it is accessible on the inside surface of the cover to an adjacent location outside the cover (this is done in a manner similar to that described in the previous paragraph), then by rotating the frame with respect to the binder until the article rests perfectly flat on the outside surface of the cover.

Various ways of rotatably mounting the frame to the rings of a binder or along a side edge of the binder are shown and described in U.S. application Ser. No. 07/897,902, previously mentioned, and in U.S. application Ser. No. 07/702,222, by Ronald M. Bianco, filed May 17, 1991, the disclosure of which is also hereby incorporated by reference.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 7 is an exploded partial view of a second preferred embodiment of the invention.

FIG. 8 is a rear view, partially in section, of the second preferred embodiment, as assembled.

FIG. 9 is a cross-sectional view of the second preferred embodiment taken along line 9—9 of FIG. 8.

FIG. 10 is a perspective view of an alternative slider piece that may be used with the second preferred embodiment.

FIG. 11 is a cross-sectional view, similar to FIG. 9, wherein the alternative slider piece is used.

DESCRIPTION OF THE PREFERRED EMBODIMENTS

An exemplary combination in accordance with the invention, shown in FIGS. 1 through 5, consists of an article 10, and an arrangement for supporting the article within a binder 12.

Figure 1:
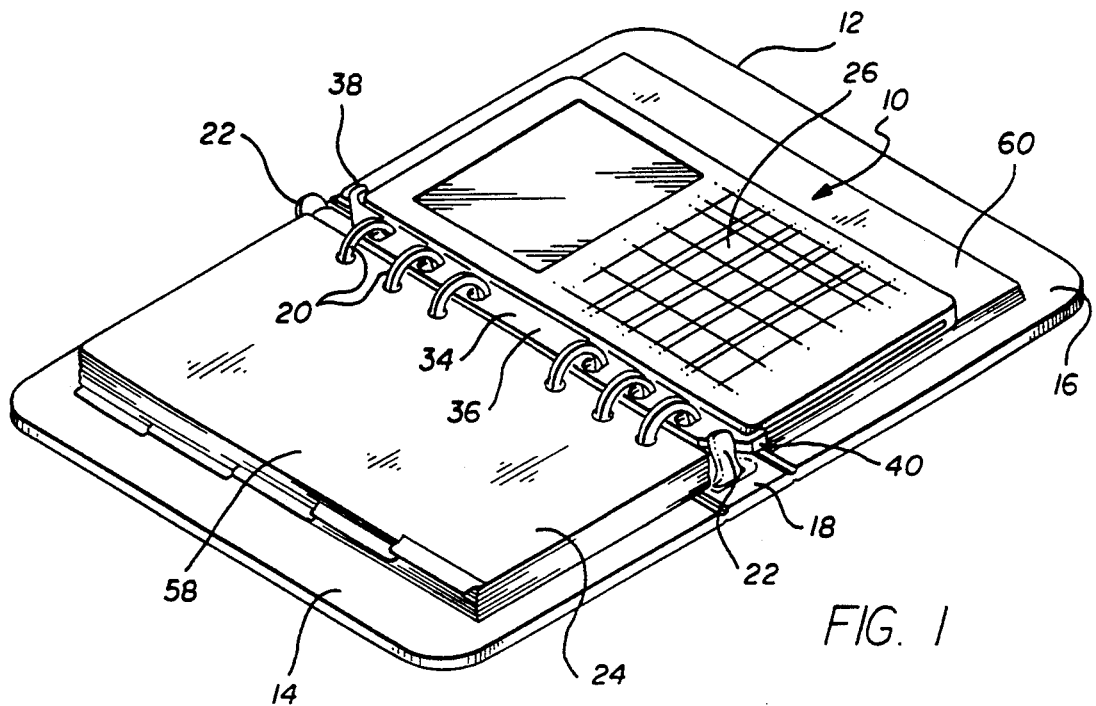
FIG. 1 is a perspective view of a ring binder with a first preferred embodiment of the invention, which includes an attachment having a calculator slidably mounted to a frame and positioned to the right of the binder rings.
Figure 2:
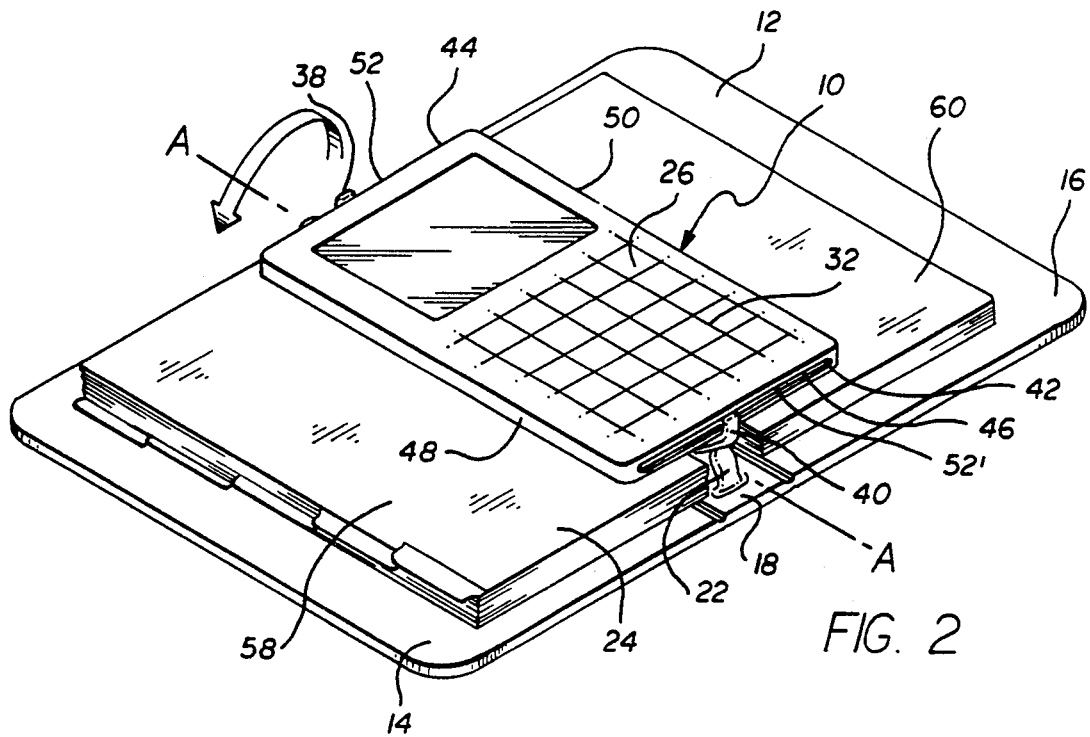
FIG. 2 is a perspective view of the binder and attachment in FIG. 1, wherein the calculator is shown at an intermediate position between the first position on the right side of the rings and a second position on the left side of the rings.

The binder 12, shown in FIGS. 1 and 2, is of a common variety, having two rigid, rectangular panels 14 and 16 forming front and back covers that are each hingedly connected along one edge to an elongated spine 18. A plurality of similar openable metal rings 20 that are spring-loaded are evenly spaced along the spine 18, being positioned on an axis A—A that extends longitudinally along the center of the spine. The rings 20 can be opened or closed by depressing or raising two tabs 22 at opposite ends of the spine 18, in the conventional manner. The binder contains a plurality of rectangular paper pages 24 that fit between the covers 14 and 16 and have holes punched therein that receive the rings 20. Thus, the pages 24 can be turned individually when the rings 20 are closed, and can be removed by opening the rings.

The article 10 is a calculator 26. It is intended, in accordance with the invention, that the calculator may be used in conjunction with the written contents of the binder pages 24. It should be understood that, instead of a calculator 10, the article can be of a different nature. For example, it can be another type of electronic device such as a data storage device, a spell-checker, a dictionary, etc. Alternatively, the article may be a housing or a slipcase that forms a support member for the above-mentioned devices or simply for a note pad of one type or another.

The calculator 26 is generally thin, flat, rectangular and plastic. It has a front working surface 32 having operating buttons and a display, a back surface 42, a top edge surface 44, a bottom edge surface 46, a first side surface 48 and a second side surface 50. Extending substantially along the full length of both the top edge surface and the bottom edge surface are U-shaped slots 52, 52' (see FIGS. 3 and 5). Each slot has a first end 54, 54', and a second end 56, 56'. The slots are generally of constant depth, except adjacent each end, wherein it is preferable that the slots be made slightly deeper.

The article 10 is held within the binder 12 by a frame 34. This frame 34 is of molded plastic construction with rounded outer corners for ease of handling and an attractive appearance. Alternatively, the corners may be angled to avoid contacting the ring openings tabs 22. The frame has a center portion 36 that extends along and parallel to the axis A—A of the rings 20 and two integrally formed arms 38 and 40 that extend perpendicularly from the top and bottom of the center portion 36 and away from the rings 20, thus defining a narrow opening into which the rectangular article 10 is disposed. The size and shape of the frame 34 may be such that it conforms to, or is slightly smaller than the pages 24 that it overlies when in use.

The center portion 36 of the frame 34 defines a plurality of circular apertures 28 that correspond in size, number and position to the rings 20 of the binder 12, thus allowing the frame 34 to be placed and held within the binder between the selected pages, such as the pages 58 and 60 of FIGS. 1 and 2.

Figure 3:
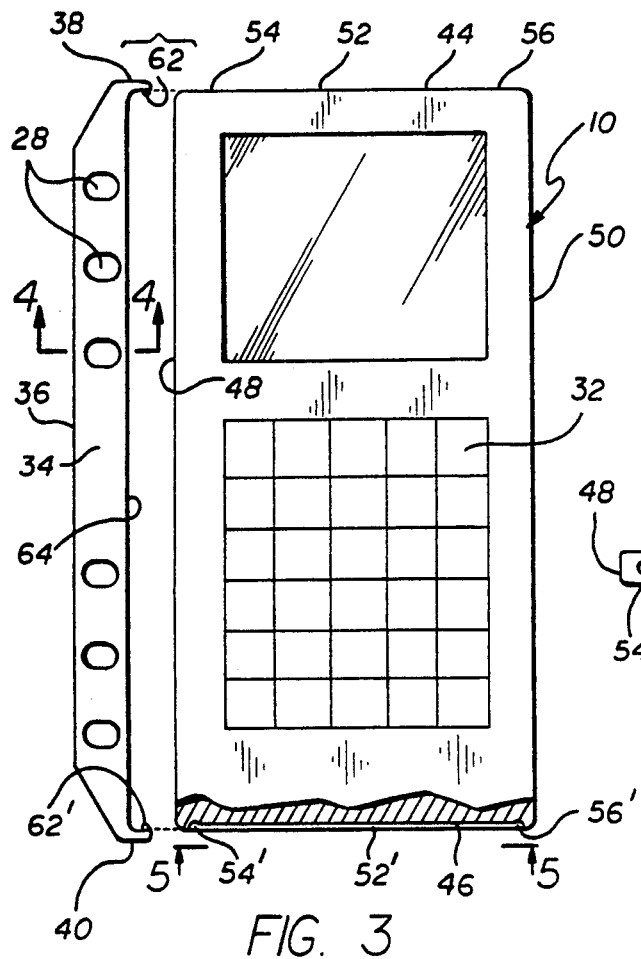
FIG. 3 is a front view of the attachment shown in FIG. 1 with the frame unattached to the calculator and the calculator shown partially in section.
Figure 4:
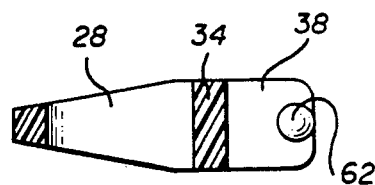
FIG. 4 is a cross-sectional view of the frame taken along line 4—4 of FIG. 3.
Figure 5:
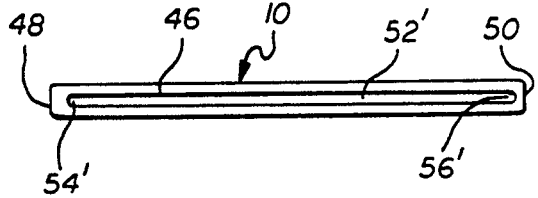
FIG. 5 is a bottom view of the article taken from line 5—5 of FIG. 3.

As shown in FIGS. 3 and 4, each arm 38, 40 has a free end that holds an inwardly-directed, slot-engaging pin 62, 62', respectively. The pins 62, 62' are sized to fit within the slots 52, 52' of the top edge surface and the bottom edge surface of the article 10, respectively. The frame is sufficiently resilient so that the arms may be spread apart slightly to permit the pins to be received within the slots. In an alternative embodiment, the slots may be shaped so that the pins will snap into the slots to form a more rigid connection.

To improve the overall appearance of the attachment, it is preferred that an inside edge 64 of the frame and the first side surface 48 of the calculator are shaped to closely conform to each other when the pins 62, 62' are received by the first ends 54, 54' of the slots 52, 52'. Similarly, the second side surface 50 of the article may be shaped to conform to the inside edge 64 of the frame when the pins are received by the second ends 56, 56' of the slots.

As will be readily apparent, the article may be moved from one side of the rings to the other with the front working surface 32 of the article accessible to a user in both locations. For example, if the article is located on the right side of the rings, as shown in FIG. 1, and it is desired to place the article on the pages on the left side of the rings, the article 10 may be grasped, lifting the article and frame slightly. The frame will then move along the rings of the binder and the article will rotate on the pins of the frame to a point wherein the first side surface of the article clears the inside edge of the frame. At this point, the article may be slid along the pins (see FIG. 2) from the first ends 54, 54' of the slots to the second ends 56, 56' of the slots. It is noted that due to the slot ends being slightly deeper than the rest of the slot, the pins will tend to snap out of and into the first ends and second ends, respectively, creating a more rigid connection, when the article is completely moved to one side of the frame or the other. After the pins have been received in the second ends, the article is then rotated on the pins and the frame is slid counterclockwise on the rings until the article rests flat on the pages on the left side of the rings.

Figure 6:
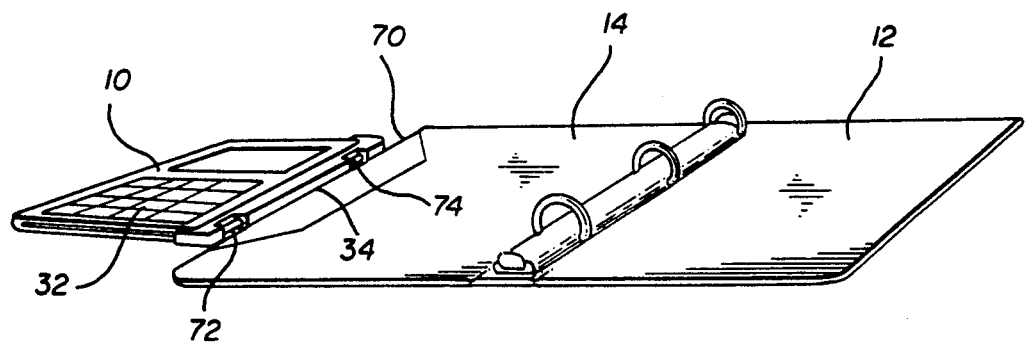
FIG. 6 is a perspective view of the first preferred embodiment of the invention wherein the attachment of the present invention is mounted on a side edge of the front cover of the binder.

With reference now to FIG. 6, a second embodiment of the present invention is shown wherein the frame 34 is hingedly connected to a side edge 70 of the front panel 14 by hinges 72 and 74. The hinges used may be of a type as shown in U.S. application Ser. No. 07/897,902, referred to earlier.

As with the attachment shown in FIGS. 1-2, the attachment shown in FIG. 6 may be moved between two adjacent locations, one wherein the article 10 rests inside the binder on the front panel 14 and the other wherein the article is positioned outside, but adjacent to, the front cover panel. In both locations, the front working surface 32 of the article, in this case a calculator, is accessible.

Additionally, because the frame and binder are secured together by hinges 72, 74, the frame may be rotated counterclockwise until the article rests outside the binder on the front panel, again with the front working surface of the article accessible to a user.

With reference now to FIGS. 7-9, an alternative embodiment of the invention is shown wherein a sliding piece 80 is mounted between the arm 40 of the frame 34 and the bottom edge surface 46 of the article 10. The sliding piece has an outwardly extending cylindrical post 82 that is rotatably received in a bore 84 of the arm. The sliding piece also has an inwardly directed grooved surface 86. In a preferred embodiment, the grooved surface includes a plurality of concave depressions 88. During assembly, a plurality of ball bearings 90 are mounted between the concave depressions and the bottom edge slot 52' of the article. The use of ball bearings makes it easier to slide the article from one location to another and substantially eliminates torque forces that sometimes affect sliding of the article when only a single pin is mounted in each arm.

An alternative sliding piece is shown in FIGS. 10-11, wherein sliding piece 92 having an integral inwardly extending bearing portion 94 is received in a squared-off bottom edge slot 96' of an article. The bearing portion may have rounded portions 98 connected by straight portions 99 to reduce the overall weight of the attachment.

As will be appreciated from the above description, the present invention allows an article, such as an electronic calculator, to be securely attached to the rings of a binder or to a side edge of either cover of a binder so as to make it available for use on the inside of, outside of, or alongside the binder, in conjunction with, or independently of the information contained within the binder. Such an attachment is both easy to use and simple to manufacture.

While particular embodiments of the invention have been illustrated and described for the purpose of enabling a person of ordinary skill in the art to make and use the invention, it will be appreciated that the invention is not limited thereto. Accordingly, any modifications, variations or equivalent arrangements within the scope of the attached claims should be considered to be within the scope of the invention.

What is claimed is:

1. An attachment for a binder comprising:
   a frame having two spaced-apart arm portions;
   a means associated with the frame for rotatably attaching the frame to the binder;
   a first slot engaging element mounted to one arm portion and a second slot engaging element mounted to the other arm portion;
   an article having a front surface, a top edge surface and a bottom edge surface, the top edge surface defining a slot that slidably receives the first slot engaging element and the bottom edge surface defining a slot, parallel to the slot in the top edge surface, that slidably receives the second slot engaging element; and
   each slot having a first end and a second end such that when the frame is attached to the binder and when said first and second slot engaging elements are adjacent the first ends of their respective slots, the front surface of the article may be placed in a face up position at a first location relative to the binder and when said first and second slot engaging elements are adjacent the second ends of their respective slots, the front surface may be placed in a face up position at a second location adjacent to said first location.

2. An attachment for a binder comprising:

a frame having a center portion and two spaced-apart arm portions that extend from said center portion;

a means associated with the frame for rotatably attaching the frame to the binder;

a first slot engaging element mounted to one arm portion and a second slot engaging element mounted to the other arm portion, the slot engaging elements mounted in opposed relationship to each other;

an article having a front surface, a top edge surface and a bottom edge surface, the top edge surface defining a slot that slidably receives the first slot engaging element and the bottom edge surface defining a slot, parallel to the slot in the top edge surface, that slidably receives the second slot engaging element; and each slot having a first end and a second end such that when the frame is attached to the binder and when said first and second slot engaging elements are adjacent the first ends of their respective slots, the front surface of the article may be placed in a face up position at a first location relative to the binder and when said first and second slot engaging elements are adjacent the second ends of their respective slots, the front surface may be placed in a face up position at a second location adjacent to said first location.

3. The binder attachment of claim 2, wherein the first and second slot engaging elements are first and second inwardly directed pins, respectively.

4. The binder attachment of claim 3, wherein the top edge slot and the bottom edge slot each have increased depth adjacent the ends thereof.

5. The attachment of claim 2, wherein each of said first and second slot engaging elements is a slider piece rotatably mounted to its respective arm portion and having an inwardly facing elongated bearing portion that is slidably received in its respective slot.

6. The binder attachment to claim 5, wherein each of said spaced-apart arm portions has a bore and each of said slider pieces has a post that is rotatably received in the bore of its respective arm portion.

7. The binder attachment of claim 2, wherein each of said first and second slot engaging elements includes a plurality of ball bearings and a slider piece rotatably mounted to its respective arm portion and having an inwardly facing grooved surface for receiving the plurality of ball bearings, said ball bearings mounted between the grooved surface and their respective slot in the article.

8. The binder attachment of claim 7, wherein each grooved surface is a plurality of concave depressions, each concave depression receiving a single ball bearing.

9. The binder attachment of claim 2, wherein the center portion of the frame has an inside edge and the article has a first side edge and a second side edge, said frame and article being shaped such that said first side edge is closely conformed and adjacent to said inside edge in the first location and said second side edge is closely conformed and adjacent to said inside edge in the second location.

10. A binder/attachment combination, comprising:

a binder having a front cover, a rear cover and a spine securing the front and rear covers, each cover having an interior surface and an exterior surface;

a frame rotatably mounted to the binder having a center portion and two spaced-apart arm portions that extend from said center portion;

a first slot engaging element mounted to one arm portion and a second slot engaging element mounted to the other arm portion, the slot engaging elements mounted in opposed relationship to each other;

an article having a front surface, a top edge surface and a bottom edge surface, the top edge surface defining a slot that slidably receives the first slot engaging element and the bottom edge surface defining a slot, parallel to the slot in the top edge surface, that slidably receives the second slot engaging element; and each slot having a first end and a second end such that when said first and second slot engaging elements are adjacent the first ends of their respective slots, the front surface of the article may be placed in a face up position at a first location relative to the binder and when said first and second slot engaging elements are adjacent the second ends of their respective slots, the front surface may be placed in a face up position at a second location adjacent to said first location.

11. The binder attachment of claim 10, wherein the first and second slot engaging elements are first and second inwardly directed pins, respectively.

12. The binder attachment of claim 11, wherein the top edge slot and the bottom edge slot each have increased depth adjacent the ends thereof.

13. The attachment of claim 10, wherein each of said first and second slot engaging elements is a slider piece rotatably mounted to its respective arm portion and having an inwardly directed elongated bearing portion that is slidably received in its respective slot.

14. The binder attachment to clam 13, wherein each of said spaced-apart arm portions has a bore and each of said slider pieces has a post that is rotatably received in the bore of its respective arm portion.

15. The binder attachment of claim 10, wherein each of said first and second slot engaging elements includes a plurality of ball bearings and a slider piece rotatably mounted to its respective arm portion and having an inwardly directed grooved surface for receiving the plurality of ball bearings, said ball bearings mounted between the grooved surface and their respective slot in the article.

16. The binder attachment of claim 15, wherein each grooved surface is a plurality of concave depressions, each concave depression receiving a single ball bearing.

17. The binder attachment of claim 10, wherein the center portion of the frame has an inside edge and the article has a first side edge and a second side edge, said frame and article being shaped such that said first side edge is closely conformed and adjacent to said inside edge in the first location and said second side edge is closely conformed and adjacent to said inside edge in the second location.

18. The binder/attachment combination of claim 10, wherein said frame is attached at the spine of the binder.

19. The binder/attachment combination of claim 10, wherein said frame is attached along a side edge of said binder.

20. A binder/attachment combination, a binder having a front cover, a rear cover, a spine securing the front and rear covers and a plurality of openable rings;

a frame having a center portion and two spaced-apart arm portions that extend perpendicularly from said center portion, said center portion having a plurality of apertures for engagement with the openable rings;

a first slider piece rotatably mounted to one arm portion and a second slider piece rotatably mounted to the other arm portion, each of said slider pieces having inwardly facing elongated surfaces that define a plurality of concave depressions;

a first plurality of ball bearings associated with the concave depressions of the first slider piece and a second plurality of ball bearings associated with the concave depressions of the second slider piece;

an article having a front surface, a top edge surface and a bottom edge surface, the top edge surface defining a slot that slidably receives the first plurality of ball bearings and the bottom edge surface defining a slot, parallel to the slot in the top edge surface, that slidably receives the second plurality of ball bearings; and each slot having a first end and a second end such that when the frame is attached to the binder and when said first and second slider pieces are adjacent the first ends of the their respective slots, the front surface of the article may be placed in a face-up position at a first location on one side of the openable rings and when said first and second slider pieces are adjacent the second ends of their respective slots, the front surface may be placed in a face-up position at a second location on the other side of the openable rings.

* * * * *